US006797034B2

(12) United States Patent
Sugitatsu et al.

(10) Patent No.: US 6,797,034 B2
(45) Date of Patent: Sep. 28, 2004

(54) METHOD OF PRODUCING REDUCED METALS AND APPARATUS FOR REDUCING METAL OXIDES

(75) Inventors: Hiroshi Sugitatsu, Osaka (JP); Hidetoshi Tanaka, Osaka (JP); Takao Harada, Osaka (JP)

(73) Assignee: Kabushiki Kaisha Seiko Sho, Kobe (JP)

( * ) Notice: Subject to any disclaimer, the term of this patent is extended or adjusted under 35 U.S.C. 154(b) by 172 days.

(21) Appl. No.: 10/154,962

(22) Filed: May 28, 2002

(65) Prior Publication Data

US 2002/0189403 A1 Dec. 19, 2002

(30) Foreign Application Priority Data

May 30, 2001 (JP) ........................................ 2001-162123

(51) Int. Cl.$^7$ .............................................. C12B 13/14
(52) U.S. Cl. ............................ 75/484; 75/503; 75/505; 266/156; 266/160
(58) Field of Search .......................... 75/484, 503, 505; 266/156, 160

(56) References Cited

U.S. PATENT DOCUMENTS

| | | | | |
|---|---|---|---|---|
| 4,323,391 A | * | 4/1982 | Honda et al. .............. | 75/10.31 |
| 5,244,490 A | | 9/1993 | Agarwal | |
| 5,425,792 A | | 6/1995 | Bishop et al. | |
| 5,824,134 A | | 10/1998 | Powers | |
| 5,989,019 A | | 11/1999 | Nishimura et al. | |
| 6,063,156 A | | 5/2000 | Negami et al. | |
| 6,129,777 A | | 10/2000 | Fuji et al. | |
| 6,149,709 A | | 11/2000 | Uragami et al. | |
| 6,152,983 A | | 11/2000 | Kamijo et al. | |
| 6,241,803 B1 | | 6/2001 | Fuji | |
| 6,251,161 B1 | | 6/2001 | Tateishi et al. | |
| 6,254,665 B1 | | 7/2001 | Matsushita et al. | |
| 6,258,149 B1 | | 7/2001 | Sugiyama et al. | |
| 6,296,479 B1 | | 10/2001 | Nishimura et al. | |
| 6,319,302 B1 | | 11/2001 | Harada | |
| 6,334,883 B1 | | 1/2002 | Takenaka et al. | |
| 6,368,379 B1 | | 4/2002 | Tateishi et al. | |
| 6,447,713 B1 | | 9/2002 | Monteyne | |
| 2002/0003324 A1 | * | 1/2002 | Kamikawa et al. ......... | 266/171 |

FOREIGN PATENT DOCUMENTS

| | | |
|---|---|---|
| DE | 29 23 726 | 12/1980 |
| DE | 29 35 544 | 3/1981 |
| EP | 0 969 105 | 1/2000 |
| JP | 56-25936 | 3/1981 |
| JP | 56-51536 | 5/1981 |
| JP | 5702211 | * 2/1982 |
| JP | 57065784 | * 4/1982 |
| JP | 6-73384 | 3/1994 |
| JP | 6-207782 | 7/1994 |
| JP | 11-61216 | 3/1999 |
| JP | 2000-212657 | 8/2000 |
| WO | WO 99/55919 | 11/1999 |

* cited by examiner

Primary Examiner—Melvyn Andrews
(74) Attorney, Agent, or Firm—Oblon, Spivak, McClelland, Maier & Neustadt, P.C.

(57) ABSTRACT

A method of producing reduced metals is disclosed in which a mixture of a metal oxide and a reducing agent is heated by a burner such that the metal oxide is reduced to a reduced metal. Dry-distilled gas generated during carbonization of an organic matter-containing component is used as fuel for the burner. The sensible heat of exhaust gas evolved by the burner is utilized as heat for carbonizing the organic matter-containing component. Carbide derived by carbonizing the organic matter-containing component is used as the above reducing agent. This method yields excellent cost performance. An apparatus for reducing metal oxides is also disclosed.

9 Claims, 4 Drawing Sheets

METHOD OF PRODUCING REDUCED METALS AND APPARATUS FOR REDUCING METAL OXIDES

BACKGROUND OF THE INVENTION

1. Field of the Invention

The present invention relates to a method suitably used for producing reduced metals, such as reduced iron and the like, by heating a metal oxide, such as iron oxide or the like, together with a reducing agent in a combustion furnace, and also to an apparatus for reducing metal oxides.

2. Description of the Related Art

In order to produce reduced iron, i.e., metallic iron, a method is known in which iron oxide is reduced by being heated together with carbonaceous material in a furnace. The furnace known as being used in this case is an electric furnace in which heating is performed by means of electrical energy, and a combustion furnace in which heating is performed by means of combustion heat evolved from fuel.

For example, a method designed to use a combustion furnace is known as disclosed in Japanese Unexamined Patent Application Publication No. 11-061216 and so on. In this method, agglomerates obtained from iron oxide and carbonaceous material, i.e., iron oxide pellets filled with carbonaceous material, are heated by a burner in a rotary hearth furnace, whereby reduced iron is produced. Of the accompanying drawings, FIG. 3 shows, as a schematic view, an apparatus taken up in explaining the production method of reduced iron using the rotary hearth furnace noted above. This apparatus is equipped with a rotary hearth furnace 1 that is constituted of a ring-shaped rotary hearth 2 and a furnace body 3 mounted to cover the rotary hearth 2. By driving means (not shown), the rotary hearth 2 can rotate, i.e., revolve, at appropriate speeds. Carbonaceous material-filled iron oxide pellets 7 are supplied to the rotary hearth furnace 1 through a feed hopper 5 for feedstock charge disposed in the furnace so that they are placed on the rotary hearth 2 and then heated and reduced while the rotary hearth is being traveled in the direction of rotation in the furnace. The pellets 7 thus reduced are taken out of the furnace by discharge means 8 located downstream in the direction of rotation. In the apparatus shown here, such discharge means are structured to be belt conveyor-type discharge means.

In the rotary hearth furnace 1, a plurality of burners 4 are employed as heating means that are positioned on the inner wall surface of the furnace body 3 and along the direction of rotation. Thus, the pellets 7 can be substantially uniformly heated in the furnace. Exhaust gas, i.e., combustion gas, evolved by burner heating is exhausted via an exhaust gas line 6 arranged at a proper portion of the furnace body 3. Subsequently, the exhaust gas is subjected to heat removal by a waste heat-recovery unit (not shown), such as a heat exchanger or the like, followed by temperature control using a temperature control unit and then by dust removal using a bag filter. The exhaust gas after being so treated is released in the air.

However, when iron oxide is reduced by burner heating as mentioned above, general-purpose fuel such as commercially available gas, heavy oil, pulverized coal or the like must be used in large amounts. Namely, mass consumption of combustion heat evolved from the general-purpose fuel is necessary, and as a result, is responsible for poor cost performance.

On the other hand, a method in which organic matter is carbonized by heating is known as disclosed in Japanese Unexamined Patent Application Publication No. 2001-3062. In this method, dry-distilled gas generated while organic matter is being heated is utilized as fuel for a burner used to heat the organic matter. Another method is known as shown in FIG. 4. In the method of FIG. 4, an externally heated kiln 10 is used as a carbonization furnace, and feedstock to be carbonized, i.e., organic matter, is put into the carbonization furnace, i.e., the kiln. After dry-distilled gas generated from the carbonization feedstock is allowed to burn in a combustion furnace, part of the resulting combustion gas is released outside via a temperature control tower and a bag filter, while the remaining gas is supplied to a heat exchanger 11 disposed in the carbonization furnace 10 so that this gas is utilized to heat the carbonization feedstock. However, the amount of heat generated by combustion of the dry-distilled gas is larger than that needed for carbonizing the organic matter. For this reason, the amount of heat having been generated cannot be wholly utilized to advantage and is partly wasted.

Japanese Unexamined Patent Application Publication No. 2000-309780 discloses a method in which large amounts of heat are supplied to a waste material such that the latter is caused to undergo dry distillation and thermal decomposition, and the resulting thermal decomposition solid products and gaseous products are reused, respectively, as fuel. However, the above publication fails to disclose how these solid and gaseous decomposition products are utilized. The publication also discloses using kilns in two stages with a view to avoiding the formation of carbonaceous solid products and gaseous products such as hydrogen, lower hydrocarbons and the like. In such an instance, equipment and facilities are so complicated as to present low cost performance. Moreover, the content of carbonaceous solid products is small so that the resulting thermal decomposition solids are difficult to be used as reducing agents.

SUMMARY OF THE INVENTION

The present inventors have conducted extensive research in solving the above-mentioned problems of the conventional art. As a result of this research, it has been found that when a carbonization furnace and a reduction furnace are combined together, reduced metals can be produced with a sharp cut in production cost. More specifically, it has been found that when dry-distilled gas generated during carbonization of organic matter is used as fuel for burner heating in metal reduction, the consumption of general-purpose fuel, such as commercially available gas, heavy oil, pulverized coal or the like, can be greatly saved. This saving in the consumption of general-purpose fuel appears to be attributed to the fact that the metal reduction requires much heat unlike the carbonization of organic matter. Namely, it has been found that when both carbonization equipment and metal reduction equipment are considered as a whole, the overall thermal efficiency can be enhanced with consequential considerable cutting in the production cost of a reduced metal.

With regard to the case where a carbonization furnace and a reduction furnace are used as combined, it has also been found that when a metal oxide is placed in advance in the carbonization furnace, a heat medium such as sand or the like, usually employed in the latter furnace is not required so that no sand separation is needed. Nor are extra process steps necessary for mixing carbonaceous matter and a metal oxide. Hence, feedstock such as a metal oxide, a reducing agent and the like can be prepared with good efficiency, and when both carbonization equipment and metal reduction equipment are considered as a whole, the production cost of a reduced metal can be markedly cut down.

The present invention has been completed based on the foregoing findings.

Accordingly, one object of the present invention is to provide a method of producing reduced metals, which can yield excellent cost performance, and an apparatus for reducing metals oxides.

Another object of the invention is to provide a method of producing reduced metals, such as reduced iron, etc., which can yield excellent thermal efficiency and minimum consumption of combustion heat from general-purpose fuel, and an apparatus for reducing metals oxides.

Yet another object of the invention is to provide a method of producing reduced metals, which can prepare feedstock, such as metal oxides, reducing agents and the like, with good efficiency, and an apparatus for reducing metals oxides.

According to one aspect of the present invention, a method of producing reduced metals from metal oxides is provided which comprises the step of: heating a mixture comprising a metal oxide and a reducing agent by means of a burner, thereby reducing the metal oxide to a reduced metal; wherein dry-distilled gas generated during carbonization of an organic matter-containing component, such as town waste or industrial waste, or solid fuel obtained by treatment thereof, is used as fuel for the burner.

Preferably, in this method, the sensible heat of exhaust gas evolved by the burner is used as heat for carbonizing the organic matter-containing component. Also preferably, carbide derived by carbonizing the organic matter-containing component is used as the reducing agent.

According to another aspect of the present invention, a method of producing reduced metals from metal oxides comprises the steps of: carbonizing an organic matter-containing component to prepare a carbide; and heating a mixture comprising a metal oxide and the carbide, thereby reducing said metal oxide to a reduced metal; wherein said metal oxide is fed together with said organic matter-containing component to carbonization furnace as heat media.

Furthermore, in this method, a metal oxide is caused to coexist as a heat medium when the organic matter-containing component is carbonized in a carbonization furnace, and a mixture of carbide taken out of the carbonization furnace and an organic matter-containing component is reduced in a reduction furnace.

According yet to another aspect of the invention, an apparatus for reducing metal oxides is provided which comprises: a carbonization furnace for carbonizing an organic matter-containing component, thereby generating dry-distilled gas; a reduction furnace, such as a movable hearth furnace, for heating a mixture comprising a metal oxide and a reducing agent by means of a burner, thereby reducing the metal oxide; and a line for supplying the dry-distilled gas to the burner as fuel therefor from the carbonization furnace.

Preferably, in this apparatus, a line for exhausting combustion gas generated by the burner is connected to the carbonization furnace for heat exchange to be performed. Also preferably, a line for supplying carbide taken out of the carbonization furnace is connected to the reduction furnace.

DESCRIPTION OF THE PREFERRED EMBODIMENTS

Figure 1:
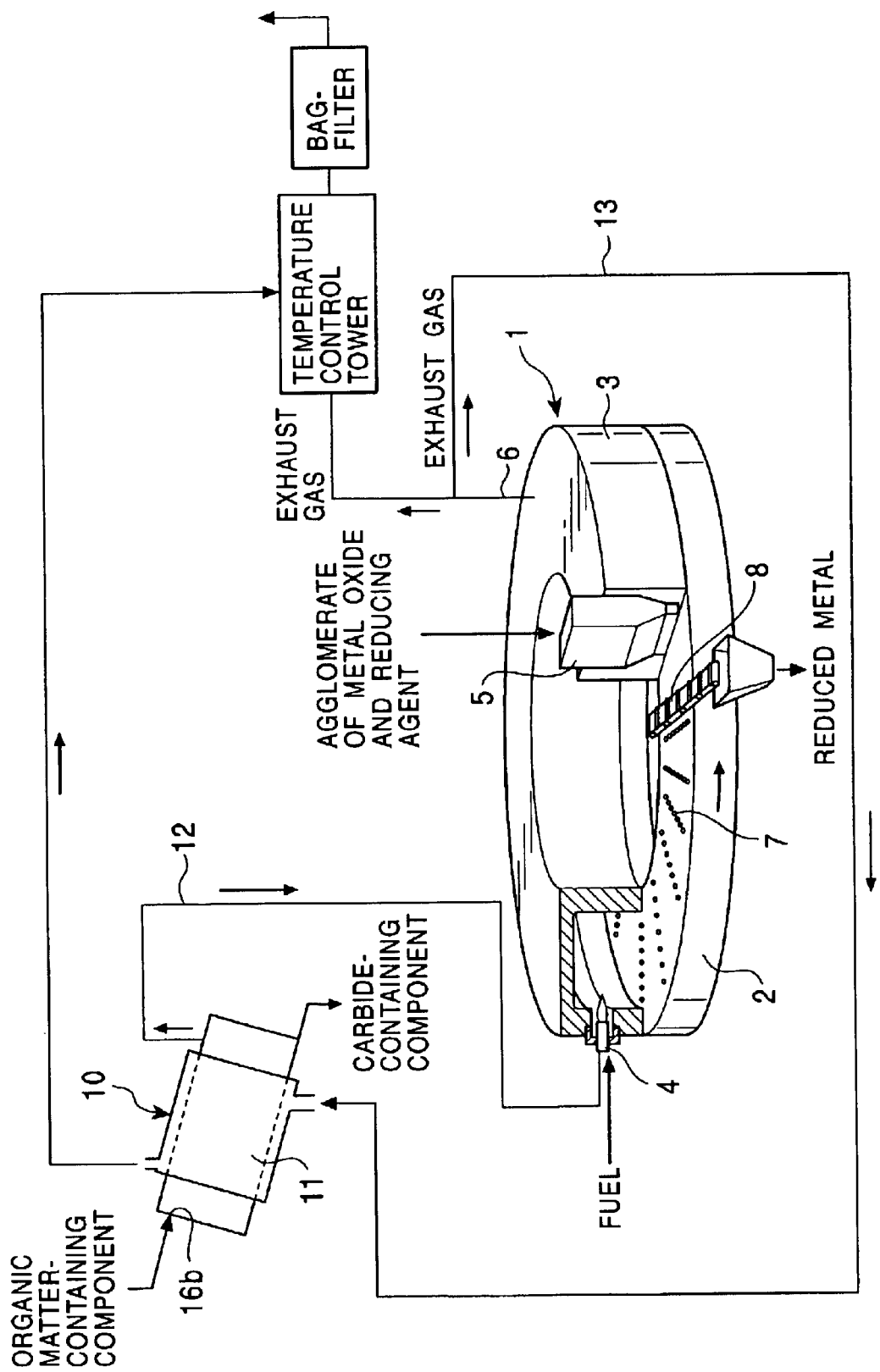
FIG. 1 is a schematic view showing one preferred embodiment of the apparatus for reducing metal oxides according to the present invention.

The present invention will now be described in greater detail with reference to the attached drawings. It should be understood that the invention is not limited to the structures and functions shown in these drawings, but various changes and modifications may be made within the scope of what has been and will be disclosed earlier and later. All such changes and modifications are to be included within the spirit and scope of the appended claims. In the drawings, like reference numerals denote like parts in order to avoid duplication.

FIG. 1 is a schematic representation of one preferred embodiment of the apparatus according to the present invention. This apparatus comprises a carbonization furnace 10 for carbonizing an organic matter-containing component, a rotary kiln in this embodiment, and a reduction furnace 1 for reducing a metal oxide, a rotary hearth furnace in this embodiment.

The carbonization furnace 10 is provided with a feed opening 16a for charging an organic matter-containing component, and heating means (not shown). Here, the heating means include combustion type heating means such as a burner and the like, and electrical heating means such as a heater, etc. The organic matter-containing component having been charged from the feed opening 16a is heated, i.e., dry-distilled, for example, at 300 to 800° C. to derive carbide. In order to improve heating efficiency, a conventional heat medium such as sand or the like are in most cases introduced together with the organic matter-containing component into the carbonization furnace 10. Dry-distilled gas generated by heating, i.e., dry distillation, is transported through a dry-distilled gas line 12 connected to the carbonization furnace 10. A gas holder may be located midway the dry-distilled gas line 12 for the dry-distilled gas to be temporarily stored, and the dry-distilled gas may be cooled to some extent.

On the other hand, the reduction furnace 1 is provided with a rotary hearth 2; a furnace body 3 for covering the hearth 2; a feed hopper 5 for charging feedstock in the furnace 1, which feedstock are agglomerates of a metal oxide such as iron oxide, etc., and a reducing agent such as a carbonaceous reducing agent or the like; burners 4 for heating the feedstock with the combustion heat of fuel, for example, at 1,000 to 1,500° C.; discharge means 8 for discharging a metal reduced by heating, such as reduced iron or the like; and an exhaust gas line 6 for releasing exhaust gas, i.e., combustion gas, evolved by the burner. The reduction furnace 1 thus structured is identical to the known reduction furnace 1 already stated earlier.

In the present invention, each burner 4 is connected to a supply line for general-purpose fuel such as commercially available gas, heavy oil, pulverized coal or the like, and further to a dry-distilled gas line 12 for transporting dry-distilled gas in part or wholly to the burner 4, which gas has been taken out of the carbonization furnace 10. In this embodiment, the gas is wholly transported. Hence, the dry-distilled gas can be used as fuel for the burner, and this brings a large saving in the amount of general-purpose fuel such as commercially available gas, heavy oil, pulverized coal or the like. Moreover, since much heat is often accumulated as sensible heat in the above-mentioned dry-distilled gas, the thermal efficiency in the system can sometimes be further improved by supplying the sensible heat through the burner 4 to the rotary hearth furnace 1. In this instance, much more saving can be obtained as to the amount of general-purpose fuel used. Here, the dry-distilled gas and general-purpose fuel are used as combined so that even when the amount and quality of the dry-distilled gas are varied, heating can be controlled by adjusting the amount and so on of general-purpose fuel. This structure is also suitable for treating an organic matter-containing component, for example, a waste material to be described later, that is easily variable in character. The dry-distilled gas and general-purpose fuel do not need to be supplied to the same burner, but may be supplied separately to their respective different burners.

If only the dry-distilled gas is used as fuel for the reduction furnace 1, the thermal efficiency in the system can be enhanced, as described above, with considerable saving in the consumption of general-purpose fuel. It is desired, however, that the sensible heat of exhaust gas evolved from the reduction furnace 1 be also utilized as viewed in FIG. 1. Namely, the exhaust gas evolved from fuel that has been burnt by the burner is partly or wholly transported toward the carbonization furnace 10 through a heating line 13, i.e., a second exhaust gas line, which heating line is arranged to diverge from the exhaust gas line 6. In the embodiment of FIG. 1, the exhaust gas is shown partly transported. The exhaust gas is supplied to a heat exchanger 11 located in the carbonization furnace 10 for the organic matter-containing component to be heated. This permits effective use of the exhaust gas having come from the reduction furnace, and therefore, further enhances the thermal efficiency.

Alternatively, the sensible heat of exhaust gas having been returned from the reduction furnace can be utilized in a second heat exchanger other than the heat exchanger 11 mentioned above. Namely, the exhaust gas is first transported to the second heat exchanger where sub-fluids such as air, water vapor and the like are heated, and thereafter, the heated fluid is supplied to the heat exchanger 11 of the carbonization furnace where the same is used as a heat source. After being used to heat the carbonization furnace, the fluid may be again heated in the second heat exchanger and reused as a heat source for the carbonization furnace. When the sub-fluid noted above is air, the air having been utilized to heat the carbonization furnace may be used as combustion air that is, for example, air to be supplied together with the above-mentioned fuel to the burner 4 of the reduction furnace. When the sub-fluid is water vapor, a boiler may be used as the heat exchanger. In the case where the second heat exchanger is used, the carbonization furnace can be prevented from being damaged because clean fluid, but not the exhaust gas having been extracted from the reduction furnace, is supplied to the carbonization furnace, i.e., the heat exchanger 11 of the latter furnace.

Exhaust gas having not been supplied to the carbonization furnace 10 is released in the air via a temperature control tower and a bag filter. On the other hand, the exhaust gas having been utilized as a heat source for the carbonization furnace 10 is mixed with the exhaust gas having not been supplied to the carbonization furnace 10 in the above temperature control tower and then passed through the bag filter and released in the air. To treat the exhaust gas having been supplied to the carbonization furnace 10 and the exhaust gas having not been supplied to this furnace, it is not necessarily required that the same temperature control tower and bag filter be employed, but this treatment may be effected using different temperature control towers and bag filters.

When the sensible heat of exhaust gas is not utilized as a heat source for the carbonization furnace, the exhaust gas may be cooled, for example, with a scrubber.

The organic matter-containing component used as feedstock for the carbonization furnace 10 is not particularly restricted so long as the same is carbonized upon heating, i.e., dry distillation, to evolve dry-distilled gas. Wood, resin and volatile matter-rich coal and the like can be used as organic matter-containing components. Suitable organic matter-containing components are chosen from waste and solid fuel obtained by treatment thereof (refuse-derived fuel or RDF). The waste includes combustible trash, such as kitchen refuse, paper, plastic and the like, disposed of by households, and industrial waste, such as waste plastics, waste tires, waste wood, shredded dust, etc., disposed of by industrial sectors. The waste has today been in the face of much difficulty in disposal and treatment. Thus, pollution burdens on the environment can be eased by the use of the waste as feedstock for the carbonization furnace 10.

On the other hand, a metal oxide such as iron oxide or the like, and a reducing agent such as a carbonaceous reducing agent or the like may be used in a mixture as feedstock for the reduction furnace 1. Agglomerates are rather preferred which are obtained by agglomerating such a mixture. The use of the agglomerates is to reduce the metal oxide with good efficiently. The agglomerates can be reduced while they are maintained as mixed, or after they are somewhat melted to such an extent that a film, i.e., an outer skin, is formed on the surfaces of the agglomerates. Reduction that can be followed in forming the outer skin of the reduced metal is one disclosed, for example, in Japanese Unexamined Patent Application Publication No. 9-256017. In the method of this publication, a metal oxide such as iron oxide or the like is reduced using reductive gas, i.e., CO gas, which is generated from a reducing agent contained in agglomerates when the latter are heated. More specifically, a reduced metal produced in an initial course of reduction with heating is caused to bond diffusively to the agglomerates and to form an outer skin of the reduced metal. Then, the concentration of the CO gas entrapped inside this outer skin is increased to internally reduce the metal oxide. The reduced metal, which has been internally formed, grows while it adheres successively to the inner surface of the outer skin mentioned above. According to the method of the above publication, a reduced metal such as reduced iron or the like can be produced with high purity.

No particular restriction is imposed on the shape of the agglomerate if the latter has a reducing agent loaded internally, i.e., filled therein. Various shapes may be used which include a lump, a granule, a briquette, a pellet, a rod and the like.

To agglomerate a metal oxide and a reducing agent, a powdery metal oxide and a powdery reducing agent are in most cases mixed with a powdery binder such as bentonite or the like, followed by agglomeration with suitable agglomerating means such as a press or the like.

As the above-mentioned reducing agent, materials such as coal, coke, char and the like, particularly powders thereof, or fine coke, i.e., coke breeze, may be used which are in common use in reducing metal oxides such as iron oxide and the like. It is desired that, rather than these materials, carbide be used which is obtained when the above-mentioned organic matter-containing component is carbonized in the carbonization furnace 10. When the carbide is used, all of the discharges from the carbonization furnace 10, i.e., dry-distilled gas and carbide, can be used in the reduction furnace 1 such as a rotary hearth furnace or the like, and equipment efficiency can be further enhanced. The carbide noted here has hitherto been applied only as a material for road beds, etc. When the carbide is utilized as the reducing agent, the amounts of conventional reducing agents can be saved with eventual cut in production cost. In particular, although expensive coke breeze has been generally frequently used as the reducing agent, the present invention is effective in saving the amount of coke breeze and hence in cutting the production cost considerably.

To produce carbide in the carbonization furnace 10, a heat medium such as sand or the like is sometimes used as previously stated. Preferably, the sand should be left removed when the resulting carbide is used as a reducing agent for the reduction furnace 1.

In the case where the carbide is used as a reducing agent for the reduction furnace 1, a metal oxide such as iron oxide or the like may be used as a heat medium for the carbonization furnace 10. The use of a metal oxide as the heat medium permits the above carbide to be used as feedstock for the reduction furnace 1 with no need for removal of the heat medium. Moreover, tar having developed in the carbonization furnace is taken outside therefrom together with the metal oxide, and hence, this furnace can be protected from becoming deposited with the tar. In addition, the metal oxide and carbide are already mixed with each other in the carbonization furnace 10 so that no extra process steps are required for mixing these two materials. The metal oxide and organic matter-containing component may be put, after being premixed, or individually without mixing, into the carbonization furnace. The metal oxide having entered the carbonization furnace is charged along with the above carbide into the reduction furnace 1 where the same undergoes reduction. In this instance, when needed, other metal oxides and/or other reducing agents may be placed in the reduction furnace 1.

In the case where, simultaneously with use of the carbide from the carbonization furnace 10 as the reducing agent for the reduction furnace 1, the metal oxide such as iron oxide or the like is used as a heat medium for the carbonization furnace 10, this alone can cut the production cost of the resultant reduced metal. Hence, the reduction furnace 1 may be heated only with general-purpose fuel since the utilization of dry-distilled gas, i.e., the heating of the reduction furnace 1 by dry-distilled gas, is not necessarily required.

The carbide and metal oxide from the carbonization furnace 10 should preferably be hot-agglomerated although cold agglomeration is also acceptable. Hot agglomeration makes highly sticky the tar contained in the carbide, thus enabling the tar to be used as a bonding agent, i.e., a binder. This can omit the use of conventional binders such as bentonite and the like, or save the amount of the same even when used.

Figure 2:
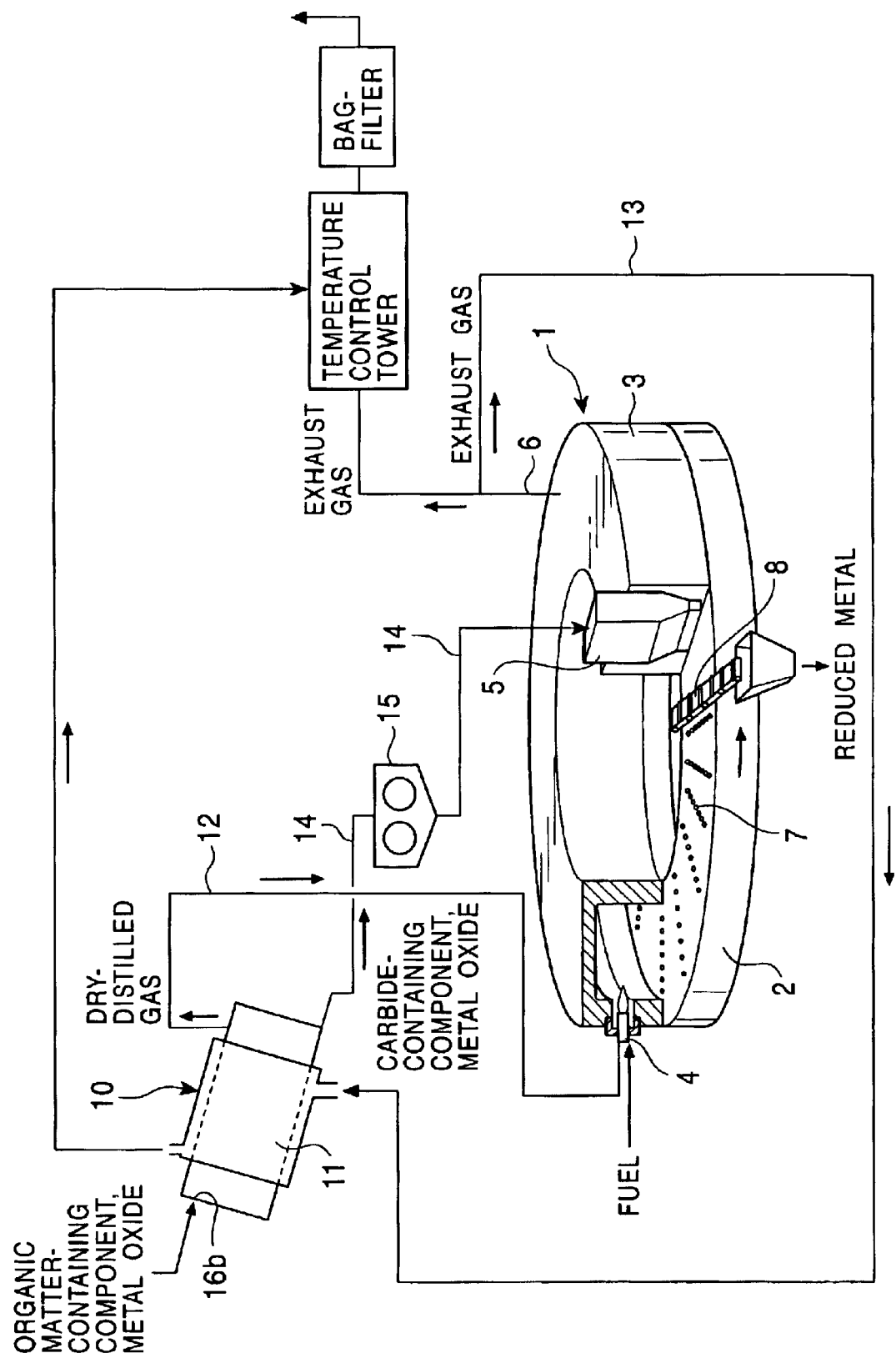
FIG. 2 is a schematic view showing another preferred embodiment of the apparatus for reducing metal oxides according to the invention.

FIG. 2 shows, as a schematic view, a modified embodiment of the apparatus illustrated in FIG. 1. This modification is different from the apparatus of FIG. 1 in the following respects; that is, (a) the carbide obtained in the carbonization furnace 10 is used as a reducing agent, (b) the metal oxide is put into the carbonization furnace 10, and (c) the carbide and metal oxide from the carbonization furnace 10 are caused to agglomerate.

Namely, the apparatus of FIG. 2 is distinguishable from the apparatus of FIG. 1 with regard to the facts that (a) a line 14 is arranged for transporting solid discharges from a carbonization furnace 10, i.e., carbide and a metal oxide in this embodiment, to a reduction furnace 1, (b) a feed opening 16b of the carbonization furnace 10 is so provided as to charge an organic matter-containing component as well as an metal oxide, and (c) agglomerating means 15, i.e., briquetting presses in this embodiment, are disposed midway the line 14 for agglomerating the above-mentioned solid discharges. The remaining structural details are common to those of FIG. 1.

With the apparatus of FIG. 2, a metal oxide is mixed with an organic matter-containing component while the latter component is being carbonized in the carbonization furnace 10. After being agglomerated by the agglomerating means 15, this mixture is supplied via the line 14 to the reduction furnace 1 where the metal oxide is reduced to a reduced metal.

As the agglomerating means, briquetting presses such as a cylinder press, a roll press, a ring-roller press and the like are used because organic matter can be easily agglomerated by being softened and compressed. In addition to these presses, various known machines chosen from extrusion molders, tumbling granulators such as a pan pelletizer, a drum pelletizer and the like may be used as the agglomerating means.

All of the above modifications (a) to (c) do not need to be carried out with respect to the apparatus of FIG. 1. Any of (a) the feed opening 16b, (b) the line 14 and (c) the agglomerating means 15 may be omitted, where desired, depending on locations to be modified.

In the apparatus of FIG. 1 and FIG. 2, a dechlorination unit for chloric gas and/or a desulfurization unit may be attached to the dry-distilled gas line 12 although no such units are usually needed. That is to say, in the reduction furnace as employed in FIG. 1 and FIG. 2, i.e., the furnace where agglomerates of a metal oxide and a reducing agent are reduced with heating by a burner, such as a rotary hearth furnace or the like, chloric gas such as chlorine, hydrogen chloride or the like, and sulfur oxide are frequently contained in exhaust gas even when the reduction furnaces is allowed to operate separately and as not combined with the carbonization furnace 10. Since the exhaust gas system is by nature greatly durable with respect to chloric gas and sulfur oxide, it is not generally necessary that a dechlorination unit and a desulfurization unit be attached to the dry-distilled gas line even when dry-distilled gas is used together with the carbonization furnace 10. For example, if the concentration of chloric gas, particularly hydrogen chloride, in the exhaust gas is not more than 2,000 ppm by volume, preferably not more than 1,500 ppm by volume, more preferably not more than 1,000 ppm by volume, no dechlorination is required for the removal of chloric gas.

However, the amounts of chloric gas and sulfur oxide become large in dry-distilled gas in some cases depending on the kind of organic matter-containing components. For example, when a chlorine-containing resin such as polyvinyl chloride, polyvinylidene chloride or the like is used as an organic matter-containing component, the resultant dry-distilled gas reveals a high concentration of chloric gas. In such an instance, it is desired that due to the likelihood of the exhaust gas system of becoming corroded, a dechlorination unit for chloric gas and a desulfurization unit be attached to the dry-distilled gas line 12.

As the dechlorination unit for chloric gas and the desulfurization unit, conventional elimination units may be used which are irrespective of a dry or wet system. For example, an eliminator using alkalis such as lime, slaked lime, soda, etc., and an eliminator using active charcoal may be used. Suitable units include a dry eliminator using slaked lime and/or active charcoal, a wet eliminator using slaked lime, and an eliminator capable of selectively removing chloric gas.

In the dry eliminator in which slaked lime and/or active charcoal are used, chloric gas and sulfur oxide can be eliminated, for example, by bringing slaked lime and/or active charcoal into contact with dry-distilled gas, e.g., by blowing slaked lime and/or active charcoal into dry-distilled gas, thereby entrapping chloric gas and sulfur oxide through adsorption or fixing in the slaked lime and/or active charcoal, and then by removing the slaked lime and/or active charcoal by a dust-removing unit.

In the wet eliminator in which slaked lime is used, chloric gas and sulfur oxide can be eliminated by bringing slaked lime slurry into contact with dry-distilled gas, e.g., in a desulfurization tower.

In the case of selective removal of chloric gas, chloric gas is selectively eliminated, for example, by passing dry-distilled gas through a chloric gas-removing tower. Dry-distilled gas, from which chloric gas has been removed, is passed through a neutralization tank to remove sulfur oxide and then supplied to the reduction furnace. On the other hand, the chloric gas thus subjected to selective removal is recovered as hydrochloric acid.

Particularly preferred eliminators include an eliminator that removes chloric gas selectively. With this eliminator, chloric gas present as a harmful component in the dry-distilled gas is recoverable as hydrochloric acid that is of commercial value.

The carbonization furnace for use in the present invention is not limited to the kiln noted earlier so long as dry-distilled gas can be evolved, and therefore, various known furnaces may be used. Suitable furnaces are selected from among a furnace in which an organic matter-containing component is heated together with a heat medium, e.g., a furnace in which an organic matter-containing component and a heat medium are heated while being mixed during rotation of the furnace body, such as a rotary kiln or the like, a furnace in which an organic matter-containing component and a heat medium are heated by hot air that is supplied from the bottom, such as a fluidized bed furnace or the like, and a furnace in which an organic matter-containing component is melted with heating in the presence of a heat medium, such as a melting bath or the like.

Next, the reduction furnace for use in the present invention is not particularly restricted if metal oxides can be reduced using dry-distilled gas as fuel, and therefore, various known furnaces may be used. In addition, organic matter-containing components and reducing agents to be used in this reduction furnace do not need to be necessarily in agglomerated form.

Suitable reduction furnaces are a furnace that is adequate for reducing agglomerates of a metal oxide and a reducing agent, particularly a furnace that is adequate for heating the above agglomerate by a burner to thereby form an outer skin of a reduced metal on the surfaces of the agglomerates and to further reduce the metal oxide existing within the agglomerates. Using these furnaces, the reduced metal can be obtained with high purity.

The suitable reduction furnaces described above include a furnace that can reduce agglomerates without degradation of their shapes, for example, those disclosed in Japanese Unexamined Patent Application Publications No. 10-102114, 10-102115, No. 10-102116, No. 10-102117 and No. 10-102118, a movable hearth furnace such as a rotary hearth furnace, etc.

The present invention will now be described in specific terms by way of the following examples. The invention should not be considered to be limited to these examples, but various changes and modifications may be made within the scope of what has been and will be disclosed earlier and later. All such changes and modifications are to be included within the spirit and scope of the appended claims.

EXAMPLE 1

Using the apparatus shown in FIG. 2, 700 kg of steel mill waste to be produced into iron and 400 kg of waste wood were put into a carbonization furnace 10 from a feed opening 16b. The resulting carbide and steel mill waste mixture was agglomerated with presses 15, and the agglomerates were supplied to a rotary hearth-type reduction furnace 1. Dry-distilled gas from the carbonization furnace 10 and general-purpose fuel, i.e., natural gas, were mixed with air at a burner 4. In the reduction furnace 1, the mixed fuel was caused to burn to heat the above agglomerates, thereby reducing the steel mill waste. Part of the exhaust gas from the reduction furnace 1, i.e., the gas designated as "Exhaust gas A" in Table 1 below, was supplied to the carbonization furnace for utilization as a heat source therefor, whereas the remaining gas, i.e., the gas designated as "Exhaust gas a" in Table 1, was heat-exchanged, i.e., cooled, and utilized to preheat air to be supplied to the burner 4. The exhaust gas having been utilized as a heat source in the carbonization furnace 10, i.e., the gas designated as "Exhaust gas a" in Table 1, was mixed, in a temperature control tower, with the exhaust gas having not been supplied to the carbonization furnace 10, i.e., the gas designated as "Exhaust gas B" in Table 1, and then released in the air via a bag filter.

With regard to the above-mentioned operation, the amount of dry-distilled gas having been burnt by the burner 4, the amount of general-purpose fuel used and the amount of preheating air used, as well as the amount of exhaust gas generated are shown in terms of their respective amounts of energy in Table 1.

TABLE 1

| | |
|---|---|
| Dry-distilled gas (sensible heat and combustion heat) | 3.8 GJ |
| General-purpose fuel | 3.8 GJ |
| Preheated air | 1.0 GJ |
| Exhaust gas A (as heat source for carbonization furnace) | 4.0 GJ |
| Exhaust gas a (after use as heat source) | 2.0 GJ |
| Exhaust gas B | 1.9 GJ |

Comparative Example

Figure 3:
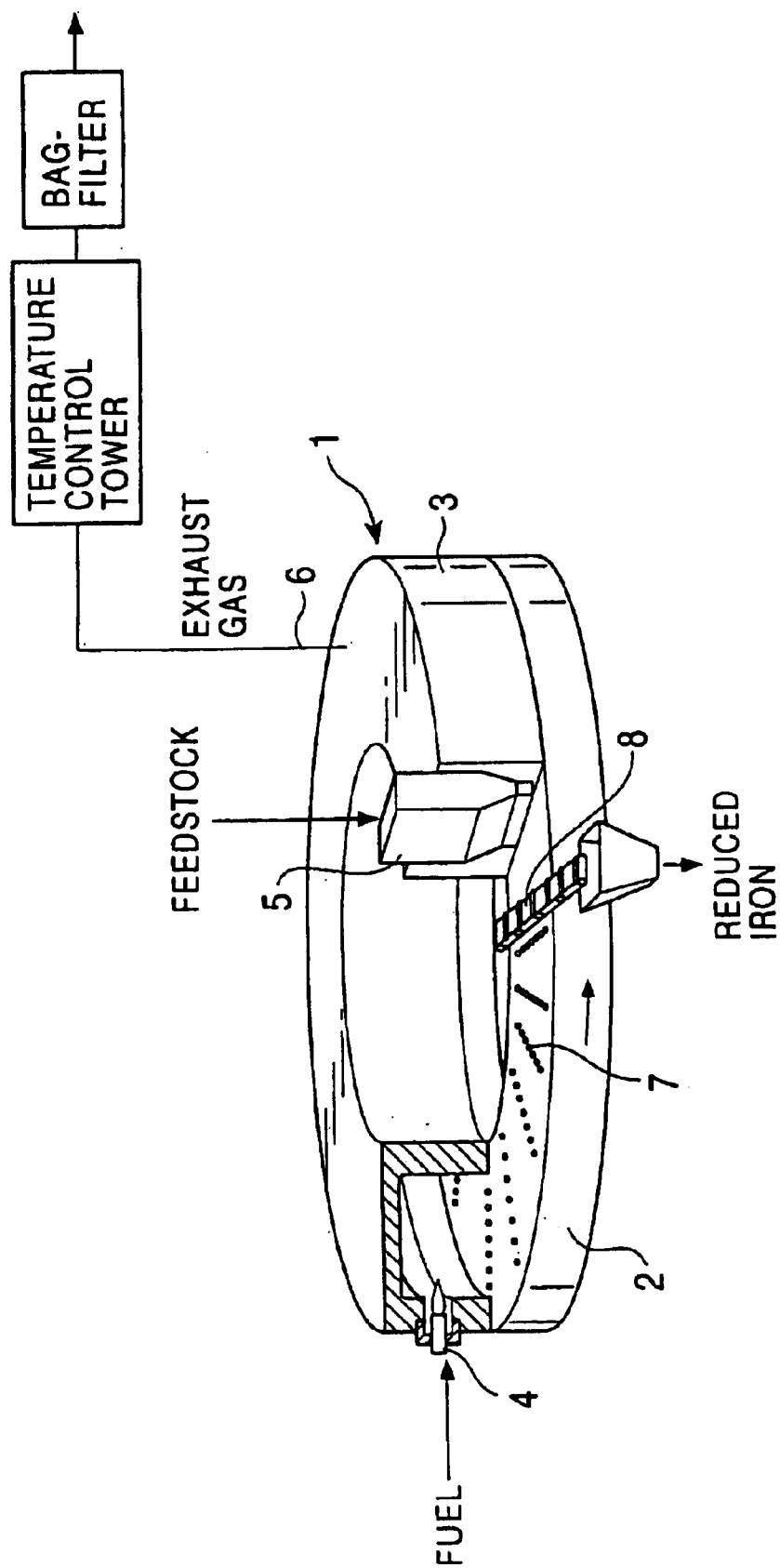
FIG. 3 is a schematic view showing a conventional reduction furnace.
Figure 4:
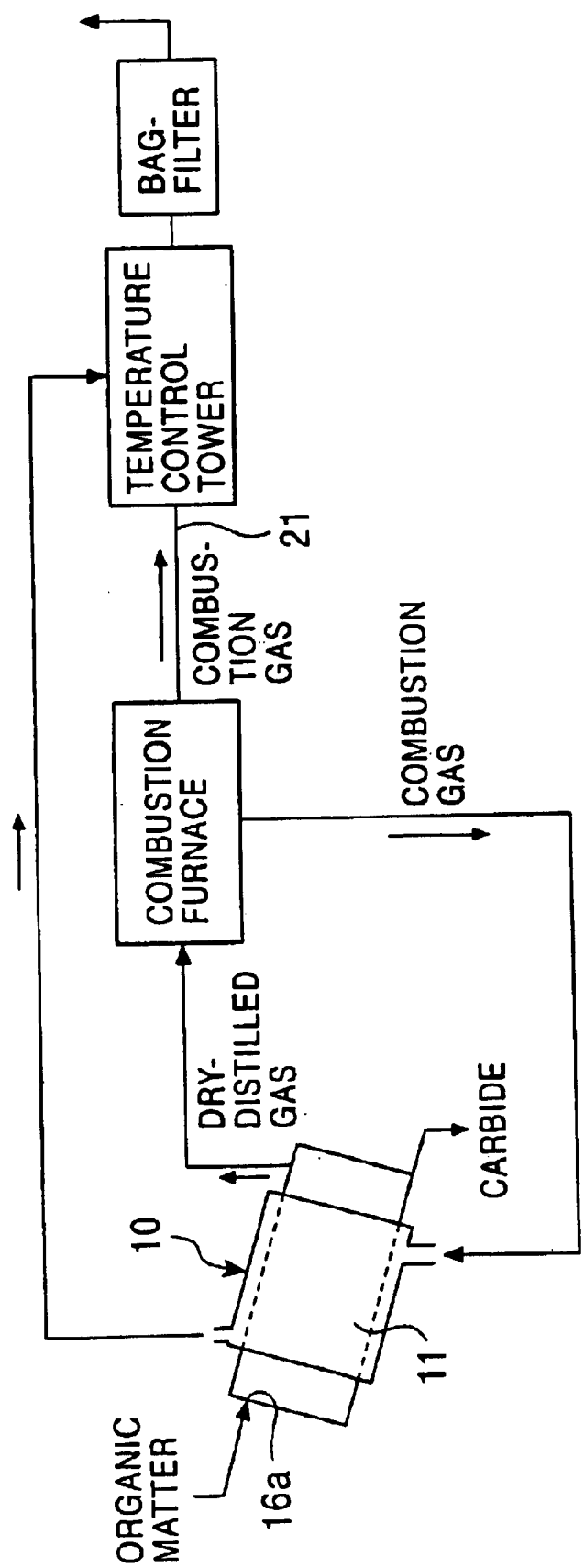
FIG. 4 is a schematic view showing a conventional carbonization furnace.

Using the apparatus of FIG. 3, agglomerates of 700 kg of steel mill waste to be produced into iron and 100 kg of coke breeze were put into a reduction furnace 1 from a feed pocket 5. General-purpose fuel, i.e., natural gas, and preheated air were mixed at a burner 4. In the reduction furnace 1, the mixed fuel was caused to burn to heat the agglomerates, thereby reducing steel mill waste. The amount of general-purpose fuel used and the amount of preheated air used, as well as the amount of exhaust gas generated are shown in terms of their respective amounts of energy in Table 2 below.

TABLE 2

| General-purpose fuel | 7.6 GJ |
|---|---|
| Preheated air | 1.0 GJ |
| Exhaust gas B | 5.9 GJ |

According to the present invention, the amount of general-purpose fuel used in reducing 700 kg of steel mill waste can be saved by 3.8 GJ. This is clear from the results of Table 1 compared to those of Table 2.

As described and shown above, in one embodiment of the invention in which dry-distilled gas evolved during carbonization of organic matter is used as fuel for burner heating that is needed in metal reduction, the potential heat of dry-distilled gas is effectively utilized. Hence, the thermal efficiency in the system can be enhanced, and the consumption of general-purpose fuel can be saved.

In another embodiment of the invention in which a metal oxide is used as a heat medium for the carbonization furnace, the carbide and metal oxide from that furnace are used as they are as feedstock for the reduction furnace. Hence, a process step for separating a heat medium in common use, such as sand, etc., and a process step for mixing a metal oxide and a reducing agent can be omitted, and feedstock such as metal oxides, reducing agents, etc., can be prepared with good efficiency.

EXAMPLE 2

The apparatus shown in FIG. 2 and an externally heated kiln as a carbonization furnace 10 were used. A wood chip and an electric arc furnace dust were used as an organic matter-containing component and a metal oxide which was a heat conductor of the carbonization furnace 10, respectively. The wood chip or a mixture of the wood chip and the electric arc furnace dust were carbonized for one hour in the carbonization furnace 10. As a result, the amounts of remaining tar (effluent) per kilogram of wood chip are shown in Table 3. The ratios of the wood chip and the electric arc furnace dust are also shown in Table 3.

TABLE 3

|  | Carbonization Temperature | | |
|---|---|---|---|
|  | 400° C. | 600° C. | 800° C. |
| Chip* only | 0.28 kg | 0.20 kg | 0.18 kg |
| Chip 2: Dust** 3 | 0.04 kg | 0.09 kg | 0.06 kg |
| Chip 1: Dust 3 | 0.02 kg | 0.13 kg | — |

*Chip: Wood chip
**Dust: Electric arc furnace dust

As shown in Table 3, the presence of the electric arc furnace dust makes the remaining tar low. This is because the electric arc furnace dust adsorbs tar.

EXAMPLE 3

Furthermore, it is preferable that after a mixture of an organic matter-containing component and a metal oxide is carbonized in a carbonization furnace, the carbide obtained from the carbonization furnace is ground.

In a similar manner as Example 2, a wood chip is carbonized in the presence of an electric arc furnace dust (the ratio of the chip to the dust: 2 to 3) for one hour at temperature shown in Table 4. Carbide obtained from the carbonization furnace was ground for three minutes at 60 rpm by using ball-mill since the particle size of the carbide preferably is 1.0 mm or less in view of agglomeration and reduction reaction. Weight percents of particle having 1.0 mm or less of the particle size are shown in Table 4.

In view of the grind of the carbide, carbonization at high temperature is preferable. As shown in Table 4, the carbonization at 400, 600 and 800° C. accelerated the grind efficiency, especially the carbonization at 600 and 800° C. is effective.

TABLE 4

|  | Carbonization Temperature | | |
|---|---|---|---|
|  | 400° C. | 600° C. | 800° C. |
| Before grind | 67.0 wt % | 71.3 wt % | 74.0 wt % |
| After grind | 90.4 wt % | 97.6 wt % | 97.3 wt % |

As mentioned above though, the particle size is preferably 1 mm or less for the agglomeration, the agglomeration is done normally in the case that particles around 5 mm of particle size are included. In addition, in the case of the agglomeration by using compression molding, a variety of particle sizes help to agglomerate.

EXAMPLE 4

The effect of retention time in a carbonization furnace (carbonization time) on the carbon content was investigated.

In the same manner as Example 2, a wood chip is carbonized in the presence of an electric arc furnace dust (the ratio of the chip to the dust: 2 to 3) at 600° C. After the carbonization and removing the electric arc furnace dust, the carbon content of the wood chip was measured. Table 5 shows the results.

TABLE 5

|  | Carbonization Time (min) | | | |
|---|---|---|---|---|
|  | 20 | 40 | 60 | 180 |
| Carbon content (wt %) | 55.4 | 63.3 | 58.5 | 53.7 |

Long carbonization time, for example 180 min, decreases the carbon content because of a preliminary reduction, whereas the preliminary reduction does not spoil the effect of the present invention. In view of obtaining carbon as a reducing agent in the latter reduction furnace, carbonization in the range of from 20 to 70 minutes is preferable because the reduction in the reduction furnace is more efficient. A more preferable range is from 40 to 60 minutes.

The carbonization time is determined by considering the carbonization temperature because high carbonization temperature makes a reduction rate of a metal oxide fast as well as the carbonization rate. More actually, the carbonization temperature and time are decided by considering equipment costs and running costs.

Consequently, the present invention is effective in achieving considerable cutting in the production costs of reduced metals.

What is claimed is:

1. A method of producing reduced metals from metal oxides comprising the step of:
   heating in a movable hearth furnace a mixture comprising a metal oxide and a reducing agent by means of a burner, thereby reducing said metal oxide to a reduced metal;

wherein dry-distilled gas generated during carbonization of an organic matter-containing component is used as fuel for said burner, and wherein the sensible heat of exhaust gas evolved by said burner is used as heat for carbonizing said organic matter-containing component.

2. A method of producing reduced metals from metal oxides according to claim 1, wherein carbide derived by carbonizing said organic matter-containing component is used as said reducing agent.

3. A method of producing reduced metals from metal oxides according to claim 1, wherein carbide derived by carbonizing said organic matter-containing component is used as said reducing agent.

4. A method of producing reduced metals from metal oxides according to claim 1, wherein said organic matter-containing component is waste, or, solid fuel obtained by treatment of the waste.

5. A method of producing reduced metals from metal oxides comprising the steps of:

carbonizing an organic matter-containing component to prepare a carbide; and heating in a movable hearth furnace a mixture comprising a metal oxide and the carbide, thereby reducing said metal oxide to a reduced metal;

wherein said metal oxide is fed together with said organic matter-containing component to carbonization furnace as heat media.

6. An apparatus for reducing metal oxides comprising:

a carbonization furnace for carbonizing an organic matter-containing component, thereby generating dry-distilled gas;

a movable hearth furnace for heating a mixture comprising a metal oxide and a reducing agent by means of a burner, thereby reducing said metal oxide; and a line for supplying said dry-distilled gas to said burner as fuel therefore from said carbonization furnace.

7. An apparatus for reducing metal oxides according to claim 6, further comprising a line for exhausting combustion gas generated by said burner, wherein said exhaust gas line extends from said reduction furnace and is connected to said carbonization furnace for heat exchange to be performed.

8. An apparatus for reducing metal oxides according to claim 6, further comprising a line for supplying carbide having been taken out of said carbonization furnace to said reduction furnace.

9. An apparatus for reducing metal oxides according to claim 6, further comprising a line for supplying carbide having been taken out of said carbonization furnace to said reduction furnace, and a line for exhausting combustion gas generated by said burner, wherein said exhaust gas line extends from said reduction furnace and is connected to said carbonization furnace for heat exchange to be performed.

* * * * *

UNITED STATES PATENT AND TRADEMARK OFFICE
CERTIFICATE OF CORRECTION

PATENT NO. : 6,797,034 B2  Page 1 of 1
DATED : September 28, 2004
INVENTOR(S) : Hiroshi Sugitatsu et al.

It is certified that error appears in the above-identified patent and that said Letters Patent is hereby corrected as shown below:

Title page,
Item [73], Assignee, should read:
-- [73]  Assignee:  Kabushiki Kaisha Seiko Sho (Kobe Steel, Ltd.),
Kobe (JP) --

Signed and Sealed this

Seventh Day of December, 2004

JON W. DUDAS
*Director of the United States Patent and Trademark Office*